United States Patent [19]

Schwabauer

[11] 4,184,822

[45] Jan. 22, 1980

[54] APPARATUS FOR MAKING POWER TRANSMISSION BELTING

[75] Inventor: Nile L. Schwabauer, Northglenn, Colo.

[73] Assignee: The Gates Rubber Company, Denver, Colo.

[21] Appl. No.: 827,282

[22] Filed: Aug. 24, 1977

Related U.S. Application Data

[62] Division of Ser. No. 617,338, Sep. 29, 1975, Pat. No. 4,095,480.

[51] Int. Cl.² ............... B29D 29/00; B29C 17/00; B29H 7/22
[52] U.S. Cl. .................................. 425/28 B; 249/65; 425/DIG. 19; 425/43; 425/40; 425/50
[58] Field of Search ............ 425/28 B, 34 B, 49, 425/50, 51, 52, DIG. 110, DIG. 19; 249/65, 79, 80, 178, 179, 183

[56] References Cited

U.S. PATENT DOCUMENTS

| | | | |
|---|---|---|---|
| 1,106,506 | 8/1914 | Greenwald | 425/51 |
| 2,253,792 | 8/1941 | Leavenworth | 425/28 B |
| 2,324,991 | 7/1943 | Groney | 425/34 B |
| 2,583,085 | 1/1952 | Campbell | 425/34 B |
| 2,671,244 | 3/1954 | Freelander | 425/28 B |
| 3,934,968 | 1/1976 | Cicognani | 425/28 B |
| 3,964,846 | 6/1976 | Bliss | 425/28 B |

*Primary Examiner*—J. Howard Flint, Jr.
*Attorney, Agent, or Firm*—Curtis H. Castleman, Jr.; Raymond Fink; H. W. Oberg, Jr.

[57] ABSTRACT

The apparatus utilizes a mandrel in a substantially ring or cylindrical shape about which is disposed inwardly pressure supplying means, an annular cavity disposed between the mandrel and pressure means, and means for supplying heat to the mandrel to initiate its thermal growth during curing of the belting. The metal of the mandrel has a high coefficient of thermal expansion which during use applies radial outward pressure against the belt body being cured.

8 Claims, 5 Drawing Figures

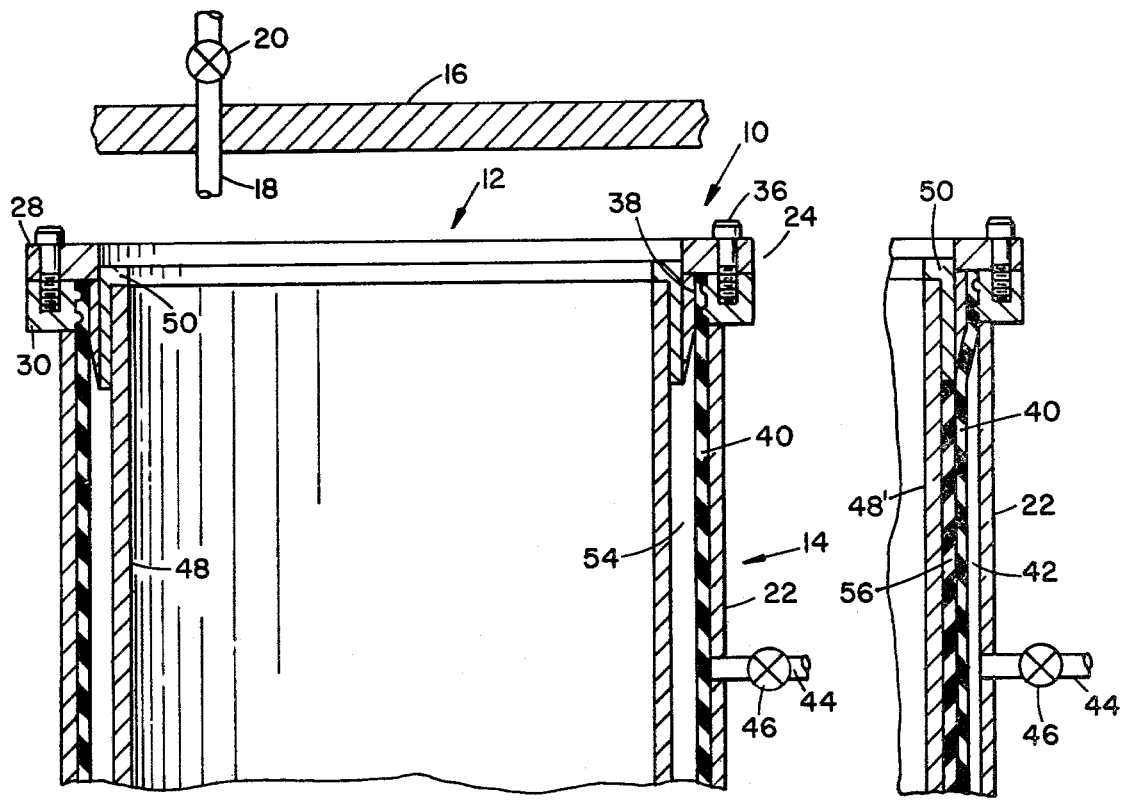
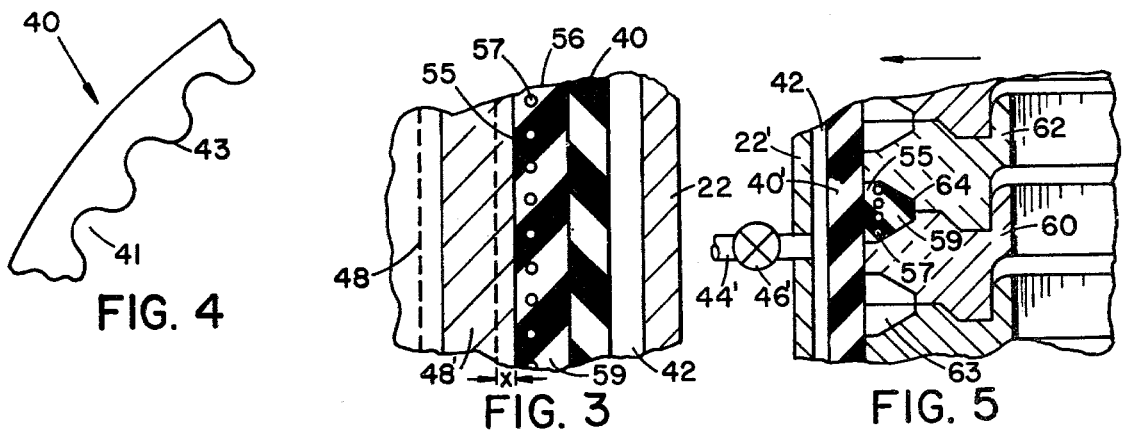

APPARATUS FOR MAKING POWER TRANSMISSION BELTING

This is a division of application Ser. No. 617,338, filed Sept. 29, 1975 now U.S. Pat. No. 4,095,480.

BACKGROUND OF THE INVENTION

This invention relates to manufacture of power transmission belting, such as the side drive type or positive drive type, having stable length tensile members disposed within an elastomeric belt body.

Power transmission belting is normally produced by superimposing alternate layers of rubber or rubber-like material and/or fabric on a building drum, with an interposed embedded tensile reinforcement, which may be applied during the building process as spirally wound cord. The resultant sleeve of uncured belting is removed from the building drum and either (1) directly cured as a sleeve within a suitable mold, from which one or more raw edge or bandless type belts may be formed, or (2) cut into individual belt segments and cured in a segmented or ring type mold, particularly (though not necessarily) for the production of belting having an outer wrap fabric cover.

With either of the mentioned manufacturing techniques, attention must be focused on any shrinkage or expansion properties of the tensile reinforcements. The thermal shrinkage or expansion properties of such tensile cord materials as nylon, cotton and polyester are generally used to advantage to mold the product and place both the overcord and undercord in a state of compression during curing. However, with stable length reinforcements, the tensile member does not extend or contract appreciably during the curing regime, whereby oftentimes either the undercord or overcord is not sufficiently compressed during molding. Such stable length tensile members also have the undesirable tendency to buckle when employing a mandrel type cure with an elastomeric air bag or bladder disposed outwardly of the sleeve (and mandrel).

Furthermore, prior art techniques for molding belt bodies having expansible or shrinkable tensile members do not satisfactorily place the tensile members in tension during curing, or do not produce a finished belt having an outside circumference within desired tolerances.

The present invention primarily overcomes these problems with apparatus adapted to apply both inwardly and outwardly directed pressures against the belt body simultaneously during curing, and apply a differential pressure outwardly against the body so as to tension the tensile members throughout the curing period in which the elastomeric rubber material is in its fluid or plastic state. Examples of the prior art include U.S. Pat. Nos. 2,573,642 to Hurry, 2,883,701 to Sauer, 3,078,205 to Sauer et al, and 3,398,218 to Richmond.

SUMMARY OF THE INVENTION

Briefly described, in the method according to U.S. Pat. No. 4,095,480 (as disclosed herein) for manufacturing power transmission belts from an uncured belt body having at least one stable length tensile member embedded in the body, the steps include (1) concentrically assembling the belt body adjacent an inwardly disposed metal mandrel of substantially ring or cylindrical shape, the metal having a coefficient of thermal expansion of at least about $10 \times 10^{-6}$ per °F., (2) heating the mandrel and causing it to expand against the belt body and to maintain the stable length tensile member under tension, (3) subjecting the belt body to pressure in a direction toward the mandrel, and (4) while maintaining the tensile member in tension, curing the belt body.

The apparatus of the invention for performing the above-defined method includes (1) an inwardly disposed metal mandrel made of a metal having the aforementioned coefficient of thermal expansion, (2) means disposed outwardly of the mandrel for supplying pressure in the direction toward the mandrel, (3) an annular cavity disposed between the mandrel and the pressure supplying means which is adapted to receive the belt body to be cured, and (4) means for supplying heat to the mandrel to cause it to expand outwardly and place the stable length tensile member in tension during curing of the belt body.

The belts made according to the above method and utilizing the above apparatus may take on various configurations and can be useful in diverse applications, including automotive use in the form of V-belts or timing belts, for instance, for agricultural or recreational use or for industrial uses. Flat belting such as conveyor belting may also be manufactured according to the method, as well as other types which will become apparent to those skilled in the art.

BRIEF DESCRIPTION OF THE DRAWINGS

Certain preferred forms of the invention will be described with reference to the accompanying drawings, wherein like numerals designate like parts, and in which:

FIG. 1 is an elevational partial sectional view of cylindrical mold apparatus;

FIG. 2 is a partial sectional view showing a portion of the mold of FIG. 1 with the assembled belt body in curing position;

FIG. 3 is a partial, blown-up view of FIG. 2 specifically showing the outward growth of the mandrel;

FIG. 4 is an edge or plan view of a portion of one form of curing bladder for manufacturing notched belts; and FIG. 5 depicts an alternative mold configuration for the manufacture of individualized belting.

PREFERRED EMBODIMENTS OF THE INVENTION

Referring to the drawings, the belt curing mold of the invention is generally designated at 10, and preferably comprises a generally cylindrical inner assembly 12 for applying outward pressure to a belt body, and an outward assembly 14 concentrically disposed for applying inward pressure to the belt body. The entire mold assembly may suitably be disposed within an autoclave 16 or similar sealed vulcanizing kettle or chamber to which is supplied steam or other suitable curing medium through conduit 18, controlled by valve 20.

The outer mold assembly 14 includes an outer cylinder 22 the ends of which are attached to upper and lower end rings 24, 26. Each end ring includes separate concentric rings 28–30, 32–34 held together by fasteners 36. Rings 28–30 and 32–34, respectively, define annular grooves 38 within which is securely attached marginal portions of inflatable bladder 40, synonymously known as an air bag or diaphragm. The ends of the bladder are thus sealed to the cylinder 22 at its upper and lower ends, defining a variable volume pressure chamber therebetween. This pressure chamber, shown in FIG. 2 at 42 is pressurizable from conduit 44, regulated by valve 46. The pressure obtainable within chamber 42, as supplied through conduit 44, is virtually independent of the pressure existing within the autoclave 16.

The inner mold assembly 12 is concentric with and nests within the outer assembly 14. This inner assembly primarily consists of inner cylindrical metal mandrel 48, having a high coefficient of thermal expansion as hereinafter defined, top spacing ring 50 and bottom capping ring 52. Between mandrel 48 and bladder member 40 is defined an annulus 54 adapted to receive a cylindrical belt body or carcass 56, shown positioned in the mold in FIGS. 2 and 3. By a "cylindrical" metal mandrel is also meant a segmented mandrel whose constituents in assembled form, such as the ring mold of FIG. 5, have a generally cylindrical shape.

Power transmission belts to be cured by the mold apparatus of the invention are separately assembled on a building lathe or drum, in usual manner. As is customary, plies of rubber and/or rubberized fabric are built up on the drum and a tensile section is applied intermediate various of the layers, usually by spirally winding tensile cord. Upon the tensile layer may be positioned additional layers of rubber and/or additional reinforcement. The resultant uncured cylindrical preform belt body is then stripped from the building drum as an uncured belt sleeve. The inside diameter of the belt sleeve 56 will be slightly larger than the outside diameter of mandrel 48 (at ambient, below curing, temperatures).

Prior to curing, the tensile cord of the uncured belt body will normally have a pitch diameter which will vary approximately up to 0.02% due to normal manufacturing tolerances including variations resulting from building drum and mold dimensions as well as thicknesses of the plied rubber layers. Conventional prior art methods for curing belt sleeves accommodate for these tolerances by shrinking or stretching the tensile cord to either a larger or smaller pitch diameter. The subject invention is primarily directed toward curing of belt bodies having embedded therein essentially stable length tensile cords, which neither shrink nor grow appreciably when subjected to curing temperatures and pressures. Examples of such stable length tensile cord materials include steel wire, aramids, and fiber glass and in general materials which do not vary more than about 0.50% in length during curing.

In carrying out the method for curing belt bodies, the inner assembly 12 is first removed from the mold, the top capping ring 50 removed, and the uncured belt sleeve slipped over and positioned concentrically about mandrel 48. Alternatively, the capping ring may remain attached to the mandrel and the uncured sleeve loaded from below and onto the mandrel. Because of the thermal growth characteristics of mandrel 48, in accordance with the invention, the mandrel should be in its unheated or room temperature condition to permit adequate clearance for loading the belt sleeve thereover. Any reduction that is needed in the outside circumferential dimension of the mandrel may be obtained by lowering its temperature such as by quenching the inner assembly 12 in cold water. The inner assembly 12, with the belt body loaded thereon, may then be reinserted within the outer mold assembly 14 and the capping ring 50 (if removed) replaced before or after reinsertion. The capping ring should fit loosely enough preferably to allow for mandrel expansion. The kettle 16 is then closed preparatory to admitting steam through line 18.

The curing operation requires supplying sufficient thermal units to vulcanize or otherwise cure the belt body 56 together with provision of oppositely directed inward pressures to each side of the belt body. In accordance with the invention, a net differential pressure directed radially outwardly is maintained during the curing operation to insure that the stable length tensile member 57 is maintained under tension throughout curing of the belt body. The net outwardly directed pressure is provided by the expansion or growth "x" of the metal mandrel 48 from its initial position, shown in phantom in FIG. 3, to its outwardly translated and enlarged position shown at 48'. To effect this outward growth for the differential in temperatures employed in curing transmission belts of this type, it is critical that the metal of mandrel 48 have a much higher coefficient of thermal expansion than characteristic of customarily employed mandrels, e.g., common steel. Accordingly, the metal of the mandrel must be chosen to have a coefficient of thermal expansion of at least about $10 \times 10^{-6}$ per °F., more preferably at least about $13.5 \times 10^{-6}$ per °F., and most preferably at least about $16 \times 10^{-6}$ per °F. Various metals and alloys satisfying this condition are useful. At the present time, for economic reasons as well as others, aluminum and its alloys are most preferred. Aluminum type 6061, having a coefficient of thermal expansion of $14.1 \times 10^{-6}$ per °F. has been found useful. Brass is an example of an alloy contemplated by the invention.

Radially directed inward pressure on the belt body is provided by the inwardly expansible bladder 40. In one form of practicing the invention this inwardly directed pressure may be applied prior to heating the mandrel 48 (to cause its outward growth), however, this is accomplished prior to rendering the rubber material in the belt body fluid or plastic, and thus prior to initiation of the curing operation. In this aspect, a heat and pressure source, such as steam, may be supplied via conduit 44 to pressurize the air bag 40 against the belt slab to remove any air between the belt body and mandrel 48. At this point the rubber undercord 59, which is still nonplastic, will be placed under slight compression, as will be even a lesser extent, the tensile members 57. For all practical purposes, any compression that the tensile members experience in this embodiment will be negligible. The chamber 42 is then pressurized with steam preferably up to about 140–170 psi. Because of the low thermal conductivity of the bladder, initially the heat transfer across the bladder is insufficient to plasticize the rubber mass of the belt body.

In general, either prior to, simultaneously, or after pressurizing the bladder 40, a heat and pressure source, preferably steam, is admitted through line 18 into the vulcanizing chamber and completely surrounds and permeates the exterior and interior of the mold 10. Kettle steam comes into direct contact with the inner surface of mandrel 48 and transfers heat units thereto. As a result, the circumferential dimension of the mandrel 48 grows at a rate proportional to its coefficient of thermal expansion and its change in temperature. As an example, using the aforementioned aluminum type 6061 as the mandrel material, a 41.5 inch outside circumference mandrel, after being elevated 250° F. in temperature experiences a circumferential growth of about 0.14 inches. This circumferential growth will provide a proportional growth in diameter of the mandrel 48 which will exceed (1) the side clearances with the belt body 56 plus (2) the factor generated by compression of the rubber material (in the overcord 55) between the mold outer surface and the tensile cord 57. The kettle steam admitted is preferably pressurized in the range from about 83 to about 140 psi, corresponding to temperatures within the range from about 325 to about 360° F. although these parameters may be varied according to individual needs.

Because the metal mandrel material conducts heat much more rapidly than the bladder member 40, selection of the proper curing regime sequence supplies heat units to the belt body beginning preferentially at the overcord area 55 and then outwardly toward the undercord 59. Thus, as is required, tensile member 57 is maintained under tension throughout the curing period when a substantial portion of the rubber material of the belt is in its plasticized state due to the concomitant mandrel growth. Continued heating supplied from steam within chamber 42 will then thereafter supply additional heating units to the belt in the undercord area 59 for a uniform cure. Using this heating gradient and thereby assuring maintenance of the tensile member under tension avoids the aforementioned problem of tensile cord buckling.

In a preferred form of the invention, as shown in FIG. 3, the belt sleeve is built inverted. This provides numerous advantages including assurance that the tensile member is maintained in tension during cure as well as maintaining very close dimensional control over the outside circumference of the belt sleeve. An additional advantage is increased resistance to undercord cracking since the undercord 59 will be placed in varying degrees of compression during use in a power transmission drive system.

If it is desired to produce notches or teeth in the undercord of the belt body, this may be accomplished using the mold of FIG. 1. It has been advantageous in this respect to employ a one-piece bladder member 40, shown in FIG. 4. The bladder member has a series of axially running notches 41 defining successive protuberances 43 which, during the curing operation, form corresponding axially running notches in the undercord 59 of the belt body. This one piece notched bladder avoids having to use the separate bladder and matrix of the prior art to provide the same function. Upon curing, the belt sleeve is then removed from the mold, as previously described, by first removing the inner mold assembly 12, and then removing the belt body 56 from mandrel 48. This removal step is facilitated by the thermal properties of the metal of mandrel 48. Because at this point the mandrel is still hot and in its expanded form, the cured belt sleeve is tightly bound to the mandrel surface. The sleeve is easily removed from the mandrel by rapidly cooling the mandrel, such as by immersing it in a tank of cool fluid such as water. The mandrel contracts (back to position 48, FIG. 3) as its temperature is lowered thus providing the necessary clearance for easily sliding the cured belt carcass from the mandrel. Thus, the normal prior art need to provide a pressure source to blow the belt sleeve off the mandrel is obviated. The cured sleeve may then be cut and shaped into one or more endless belt bodies, as is well known.

In an alternative form of the invention as shown in FIG. 5, individual belts rather than a sleeve of belting are cured in a ring-type, segmented mold. In this case, the mandrel consists of a plurality of nestable rings such as 60-62 whose surfaces define a belt cavity 63 for reception of an individual uncured belt segment 64. In accordance with the invention, the ring mandrel members 60-62 are formed of a material of high coefficient of thermal expansion, as above described, such as aluminum.

Similar to the embodiment described with respect to FIGS. 1-3, a heating source such as steam is provided which heats the inward surface of the ring mold members 60-62, etc., which in turn cause the overall mandrel to grow in the direction of the arrow shown in FIG. 5. Simultaneously, the belt body is subjected to a pressure in a direction toward the mandrel by admitting a heat and pressure source through conduit 44', regulated by valve 46'. This heat and pressure source enters chamber 42 between outer mold shell 22' and bladder 40' and pressurizes the bladder against the overcord 55 of the belt body. As the belt body rubber material becomes fluid and plastic, it flows into conformance with the cavity defined by the successive nesting mold rings. However, because of the much greater outwardly directed pressure provided by the mold rings, as compared with the inward pressure enabled by the bladder 40', the individual tensile members 57 will be maintained in tension during curing. After vulcanization, the mandrel ring mold elements 62-64, etc., are removed successively along with the included, finished belts. Normally this type of ring mold is well suited for curing belts having outer fabric covers.

The invention has been described with respect to spaced apart tensile members. However, it is an advantage of the method that there need not necessarily be flow through of the rubber material between voids in the tensile section, since the oppositely directed compressive forces due to the mandrel and bladder, respectively, compress both the overcord and undercord essentially independently. The tensile section can be tightly compacted.

It should be understood that the invention is capable of a variety of modifications and variations which will become apparent to those skilled in the art upon a reading of this specification. Such variations and modifications are intended to be encompassed within the scope of the claims appended hereto.

What is claimed is:
1. Apparatus for curing an endless power transmission belt having at least one stable length tensile member embedded in a belt body, comprising:

an inwardly disposed metal mandrel having an outer circumferentially continuous mold surface of cylindrical shape, said metal having a coefficient of thermal expansion of at least about $10 \times 10^{-6}$ per °F.;

means disposed outwardly of the mandrel for supplying pressure in a direction toward the mandrel;

said mandrel and pressure supplying means defining an annular cavity adapted to receive the belt body to be cured, the outer mold surface of the mandrel having an outside diameter at ambient, below curing temperature, that is slightly less than the inside diameter of the belt body to be cured; and means for supplying heat to the mandrel to cause the mandrel to expand outwardly to fully engage and press againt the belt body placing the stable length tensile member under tension during curing of the belt body.

2. The apparatus of claim 1 wherein said metal mandrel is hollow and has a coefficient of thermal expansion of at least about $13.5 \times 10^{-6}$ per °F.

3. The apparatus of claim 2 wherein said metal is selected from the group consisting of aluminum and its alloys.

4. The apparatus of claim 1 wherein said pressure means is an elastomeric bladder in association with a pressurizing chamber.

5. The apparatus of claim 4 wherein the bladder is an axially notched rubber cylinder formed of a single unitary member.

6. The apparatus of claim 1 wherein said heat supplying means is an autoclave provided with a steam source, in which the curing apparatus is contained.

7. The apparatus of claim 1 including in combination: means for withdrawing heat from the mandrel, such as a water quench supply, to cause the outer mold surface to contract and thereby be reduced in circumference and aid in assembly or disassembly of the belt body onto or from the mandrel.

8. The apparatus of claim 1 wherein said metal mandrel has a coefficient of thermal expansion of at least about $16 \times 10^{-6}$ per °F.

* * * * *